(12) United States Patent
Nelson

(10) Patent No.: US 7,069,781 B2
(45) Date of Patent: Jul. 4, 2006

(54) STILLWELL APPARATUS

(76) Inventor: Craig T. Nelson, 8989 Columbia Ave., St. John, IN (US) 46373

( * ) Notice: Subject to any disclaimer, the term of this patent is extended or adjusted under 35 U.S.C. 154(b) by 129 days.

(21) Appl. No.: 10/822,597

(22) Filed: Apr. 12, 2004

(65) Prior Publication Data

US 2005/0223797 A1  Oct. 13, 2005

(51) Int. Cl.
G01D 11/24  (2006.01)

(52) U.S. Cl. .................... 73/431; 73/866.5

(58) Field of Classification Search ............ 73/431, 73/864.62, 864.73, 864.5, 290 R, 290 V, 73/866.5
See application file for complete search history.

(56) References Cited

U.S. PATENT DOCUMENTS

| | | | |
|---|---|---|---|
| 1,675,210 A | 6/1928 | Campbell | 73/290 V |
| 3,825,040 A * | 7/1974 | Haisch | 141/1 |
| 4,361,038 A | 11/1982 | Schuler | 73/295 |
| 4,671,314 A | 6/1987 | Heil | 137/340 |
| 4,815,323 A * | 3/1989 | Ellinger et al. | 73/290 V |
| 5,027,655 A * | 7/1991 | Sweet | 73/290 V |
| 5,095,748 A * | 3/1992 | Gregory et al. | 73/290 V |
| 5,172,594 A | 12/1992 | Dyke | 73/290 V |
| 5,253,522 A | 10/1993 | Nyce | 73/453 |
| 5,309,763 A * | 5/1994 | Sinclair | 73/290 V |
| 5,315,563 A * | 5/1994 | Lichtenfels et al. | 367/99 |
| 5,456,108 A * | 10/1995 | Birkett | 73/290 V |
| 5,996,407 A * | 12/1999 | Hewitt | 73/290 V |
| 6,588,272 B1 | 7/2003 | Mulrooney | 73/324 |
| 6,598,473 B1 * | 7/2003 | Atkinson | 73/290 V |
| 6,615,656 B1 | 9/2003 | Breed | 73/290 V |
| 6,659,431 B1 * | 12/2003 | Fang et al. | 250/431 |

* cited by examiner

Primary Examiner—Hezron Williams
Assistant Examiner—Rodney Frank
(74) Attorney, Agent, or Firm—Whyte Hirschboeck Dudek SC

(57) ABSTRACT

This invention involves a new housing for a liquid level detection device. More particularly, the new stillwell apparatus comprises, at least one tubular section, a means for extending the length of the stillwell, a conduit for delivering a cleansing solution to the bottom of the tubular sections, a gas inlet tube for determination of the presence of hazardous gases, and a means for pressure equalization. In addition this invention reveals novel installation, removal and cleansing methods making it possible to install, remove, and cleanse the stillwell from an exterior of a vessel, thereby eliminating the need for highly trained personnel to enter the vessel in order to install, maintain, cleanse, or remove the stillwell.

28 Claims, 3 Drawing Sheets

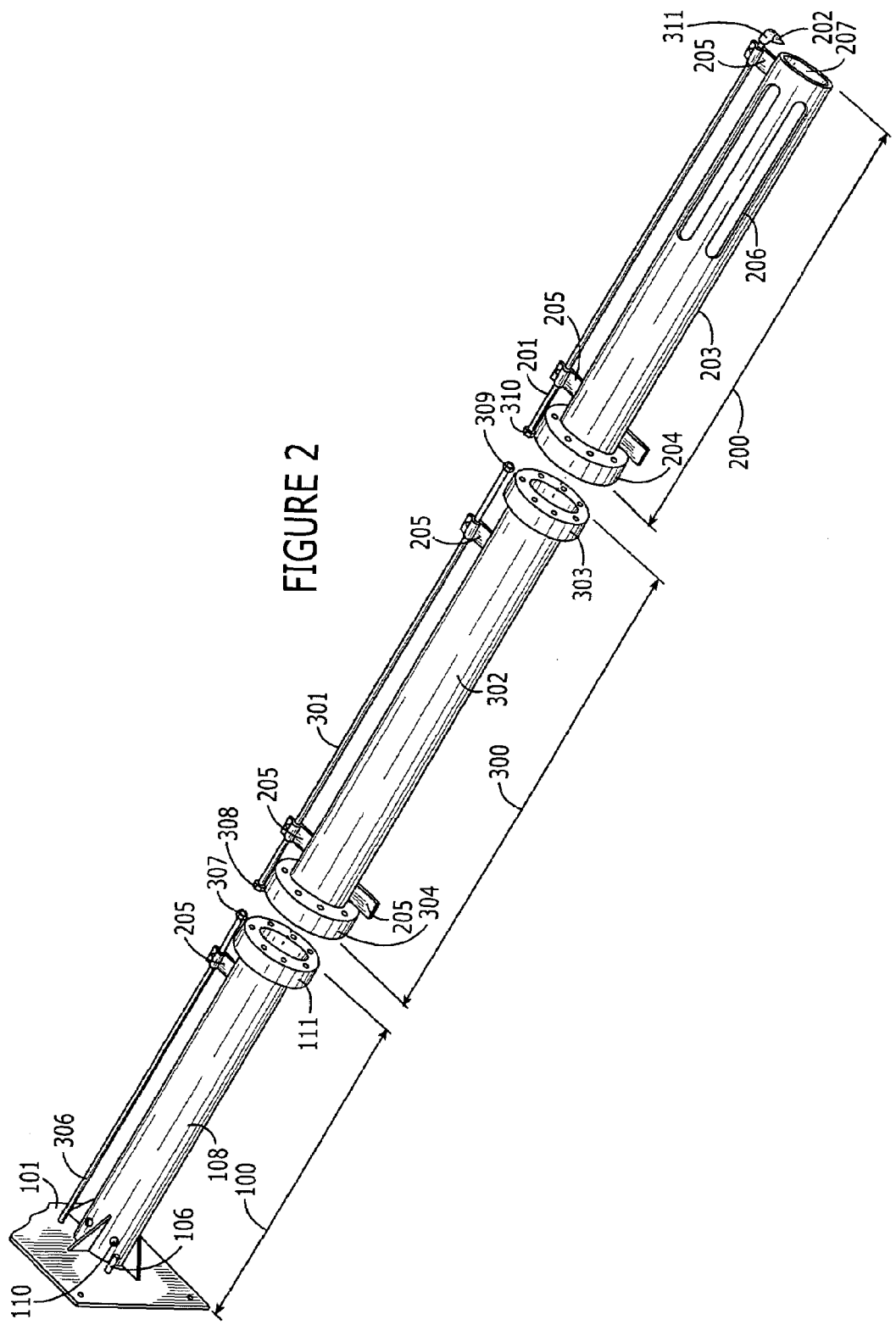

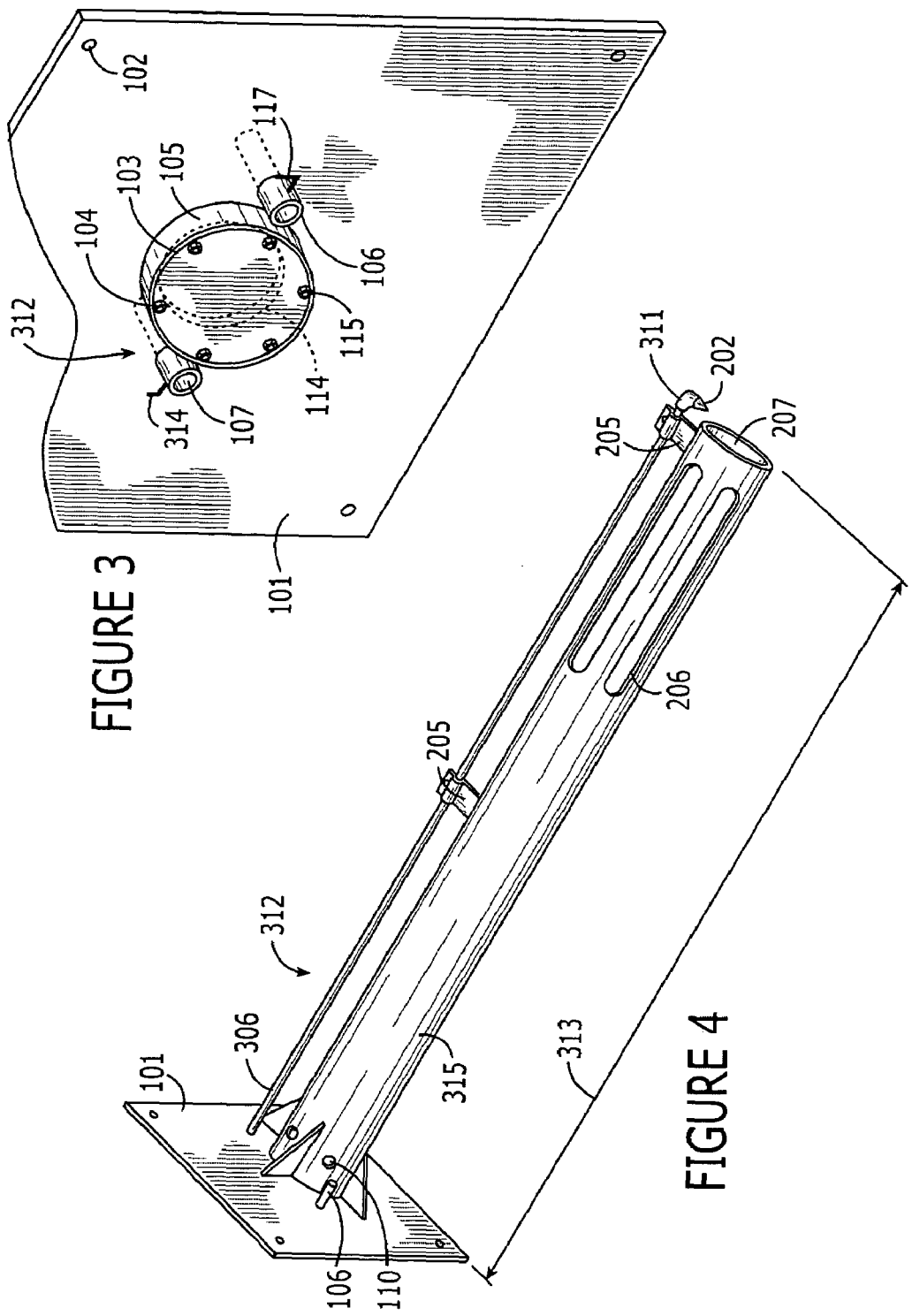

STILLWELL APPARATUS

CROSS REFERENCE TO RELATED APPLICATIONS

Not Applicable

STATEMENT REGARDING FEDERALLY SPONSORED RESEARCH OR DEVELOPMENT

Not applicable

BACKGROUND OF THE INVENTION

1. Field of the Invention

This invention relates to a casing for housing a liquid level detection device. More particularly, this invention relates to a new stillwell apparatus comprising, at least one tubular section, a means for extending the length of the stillwell, a conduit for delivering a cleansing solution to the bottom of the tubular sections, a gas inlet tube for determination of the presence of hazardous gases, and an installation and removal method making it possible to install and remove the stillwell from an exterior of a vessel, thereby eliminating the need to enter the vessel in order to install, maintain, or remove the stillwell.

2. Description of Related Art

A stillwell protects an analytical instrument from damage caused by the solution it is designed to analyze and any impurities suspended within that solution. The stillwell also stabilizes the analytical instrument from turbulence, which may dislodge the analytical instrument and give rise to inaccurate data.

In vessels such as underground storage tanks, chemical reaction vessels, water tanks, water wells, or municipal waste containers, highly trained personnel must enter the vessel to install, clean, maintain, repair, or remove the stillwell. The highly trained personnel often encounter extremely hazardous conditions upon entrance into such vessels.

Prior to entry, the highly trained personnel must follow strict safety guidelines. Generally, the strict safety guidelines, outlined for example by OSHA regulations governing permit required confined spaces, require highly trained personnel, specialized equipment, and complex procedures. The extreme hazards associated with entry into the vessel for installation, maintenance, or removal of the stillwell as well as the time involved; make for a dangerous and hazardous process.

In many applications, particularly those associated with municipal and wastewater, stillwells extend very close to the bottom of the vessel. Frequently the solution to be analyzed contains precipitates. When precipitates accumulate near the bottom of the vessel, the stillwell gets plugged and the steady flow of liquid into and out of the stillwell is interrupted which causes inaccurate readings of the analytical device. The precipitates cause additional problems when the analytical detection equipment is involved with automation of pumps, alarms, recording instruments, and subsequent processing steps. The consequences of inaccuracies associated with analytical detection are clear to those skilled in the art of analyzing liquids.

Stillwells routinely require cleansing in order to insure fluid communication with the analytical device therein. Removal or displacement of the precipitates plugging the stillwell generally requires that personnel enter the vessel and/or that personnel remove the analytical instrument from the stillwell and purge the precipitates from the lower end of the stillwell. Both cleansing means require interruption of data collection.

In addition to the aforementioned safety precautions and OSHA regulations governing such areas, personnel must also evaluate the presence of hazardous substances within the vessel and follow additional procedures developed by the National Fire Protection Association. Some vessels contain combustible liquids. Others contain combustible gases.

Gaseous substances sometimes escape from the vessel. The gases may be toxic and flammable. Gaseous substances may also enter the vessel from the exterior and cause problems. If oxygen-containing gases enter the vessel and the vessel contains combustible substances, a spark may lead to combustion.

Those concerned with these and other problems recognize the need for an improved stillwell apparatus.

It is therefore an object of the present invention to provide a novel stillwell apparatus, which minimizes or eliminates the need for personnel to enter a hazardous location such as the vessel, tank, pit or well containing the liquid to be analyzed. Another object of the invention is to provide a stillwell apparatus that can be installed, maintained, or removed from an exterior of the vessel. Another object of the present invention is to provide a novel stillwell apparatus which minimizes or eliminates the need to maintain, replace, or remove the stillwell. A further object of the present invention is to provide a novel stillwell apparatus which contains means for sampling and monitoring gases without exposing personnel to toxic substances, hazardous conditions, and circumstances leading to combustion. It is still another object of the present invention to provide a novel stillwell apparatus which has means for cleansing the lower end of the stillwell without subjecting personnel to hazardous conditions. Yet another object of the present invention is to provide a novel stillwell apparatus with means for easy movement of liquids to be analyzed into and out of the stillwell. A further object of the present invention is to provide a novel stillwell apparatus which utilizes materials that lack an ability to spark and or corrode.

These and other objects of the invention are accomplished by providing a novel stillwell apparatus having a generally tubular shape with an interior to house the instrument for analyzing liquids, an exterior for attaching the conduit through which the cleansing solution can be transferred from the top of the vessel to the bottom of the stillwell, an upper section having means for attachment to an exterior of a vessel, and a lower section for allowing entrance of fluids to be analyzed, and a means for extending the length of the stillwell apparatus. The upper section also includes a means through which gases can travel and a means for pressure equalization.

The exterior of the stillwell comprises means for attachment of the conduit through which the cleansing solution travels. The means for attachment of the conduit to the exterior of the vessel comprises tabs.

The conduit allows the cleansing solution to flow parallel to the stillwell apparatus from an external source of cleansing solution at the top of the stillwell apparatus to the bottom of the stillwell apparatus. The conduit through which the cleansing solution flows further comprises a valve at the conduit upper end for attachment to the external source of cleansing solution. The conduit lower end comprises a nozzle for directing the cleansing solution at the portholes and/or lower end openings of the lower section of the stillwell.

The external source of cleansing solution at the top of the stillwell apparatus houses a cleansing solution. The cleansing solution comprises gaseous cleansers, solid cleansers, liquid cleansers, and mixtures of cleansers. The cleansing solution may also be water or compressed air.

The upper section of the stillwell comprises means for attachment of the stillwell to the outside of a vessel. The upper section of the stillwell also comprises means for entrance or exit of gases. In one embodiment the means for entrance or exit of gases comprises a gas inlet tube with a valve. The upper section also comprises means for pressure equalization. In one embodiment the means for pressure equalization comprises vent holes.

The upper section of the stillwell also comprises a lid. The lid has an open position and a closed position. The analytical device is inserted into the stillwell when the lid is in the open position.

The liquid to be analyzed flows into and out of the stillwell in the lower section of the stillwell apparatus. The lower section contains a plurality of portholes, which allow passage of the fluid to be analyzed into and out of the stillwell apparatus.

The stillwell apparatus comprises an upper section and a lower section and a means for extending the length of the stillwell. In one embodiment, the means for extending the length of the stillwell comprises a middle section. The stillwell length can be extended by a inserting a plurality of middle sections in between the upper section and the lower section. The extended stillwell comprises an elongate tubular structure with the lower section, the plurality of middle sections for extending the length of the stillwell apparatus and the upper section with fluid flow communication there between all sections.

In another embodiment, the stillwell apparatus comprises a one-piece stillwell. The apparatus comprises a generally tubular shape with an interior to house the instrument for analyzing liquids and an exterior for attaching the conduit through which the cleansing solution can be transferred from the top of the vessel to the bottom of the stillwell. The upper section and lower section comprise one uninterrupted piece. The upper section comprises a means for attachment to the exterior of a vessel and the opposing lower section comprises portholes which allow entrance of the fluid to be analyzed. The upper section also comprises vent holes for pressure equalization, and the gas inlet tube with the gas inlet tube valve. The exterior of the one piece stillwell comprises means for attaching the conduit through which cleansing solution passes.

Another embodiment includes a two piece stillwell wherein the upper section and lower section are two separate units that are sealingly connected to each other. The connection of the upper section to the lower section includes conventional mechanical coupling means. In one embodiment, the lower section is sealingly connected to the upper section with threaded fasteners. The lower section first end has a flange with openings therein. The upper section second end also has a flange with openings therein. The lower section first end is sealingly connected to the upper section by aligning the lower section first end flange with the upper section second end flange and inserting threaded fasteners or bolts through the openings and using a nut and washer to hold them in place.

The two piece stillwell upper section comprises the lid, the gas inlet tube, and the means for pressure equalization. The stillwell lower section comprises portholes, The stillwell exterior comprises a removably attached conduit through which cleansing solution travels from an exterior source of cleansing solution to the bottom of the stillwell.

In a more preferred embodiment, the stillwell apparatus comprises a multi-piece stillwell. The multipiece stillwell comprises a plurality of lengthening means appended there between the upper section and the lower section and in fluid flow communication with both the upper section and the lower section. The cross section of the middle section equals the cross section of the upper and lower sections and provides a consistent bore diameter throughout the entire length of the stillwell apparatus.

In the multi-piece stillwell, the upper section comprises a first end and an opposing second end. The upper section first end has means for connecting to the top of the vessel containing liquid to be analyzed. The upper section first end includes a flange with openings therein for connecting to the top of the vessel with threaded fasteners.

The upper section second end comprises means for sealingly connecting to a middle section in order to extend the length of the stillwell. The middle section comprises a tubular structure with a first end and an opposing second end. The middle section second end comprises means for sealingly connecting to the lower section first end. The middle section first end comprises means for sealingly connecting to the upper section in order to allow fluid flow communication therewith.

In the more preferred embodiment, the middle section comprises means for sealingly connecting to the lower section and the upper section comprises flanges with flange openings and insertion of threaded fasteners or bolts through the flange openings using nuts and washers to hold them in place.

The middle section first end is sealingly connected to the upper section second end to allow fluid flow communication. The middle section first end has a flange with openings therein and the upper section second end has a flange with openings therein. When threaded fasteners or bolts extend through the openings and are held in place by the nuts and washers, the middle section extends the length of the stillwell.

The upper section is attached to the top of the vessel containing liquid to be analyzed. The upper section has a means for connecting to the top of the vessel. In a preferred embodiment, the upper section first end includes a flange with openings therein for connecting to the top of the vessel with threaded fasteners.

In addition, the upper section has a lid for establishing an airtight seal when the lid is in the closed position. When the lid is in the open position, the analytical device can be inserted into or removed from the interior of the stillwell apparatus.

The upper section has a gas inlet tube for preventing or allowing movement of gas into or out of the stillwell. The gas inlet tube provides a means for allowing personnel to sample the atmospheric conditions inside the vessel to determine whether it is safe to proceed with removing the lid. The gas inlet tube has a valve and the valve has an open position and a closed position. When the gas inlet tube valve is in the open position, gas may move in or out of the stillwell through the gas inlet tube thereby allowing the conditions inside the vessel to be monitored by using any conventional gas monitoring device designed for such use. When the gas inlet tube valve is in the closed position, gas is prevented from moving through the gas inlet tube and therefore gas may not move in or out of the stillwell.

Another novel feature of the improved stillwell apparatus includes a means for allowing pressure equalization. The means for allowing pressure equalization comprises vent openings in the upper section in order to allow movement of liquid and gases into and out of the still well. The location of the vent openings in the upper section is critical to maintain an appropriate pressure within vessel and within the stillwell apparatus.

A method for installation of the improved stillwell involves inserting the improved stillwell from an exterior of a vessel through an appropriate opening and fastening to the vessel, thereby eliminating the need to enter the vessel in order to install, maintain, or remove the stillwell. A preferred method for installation of the stillwell comprises the steps of inserting the stillwell apparatus into a vessel, sealingly connecting the stillwell apparatus to the vessel, and extending the length of the stillwell apparatus. Another preferred method for installation of the stillwell apparatus includes the steps of inserting the stillwell apparatus into the vessel, increasing the length of the stillwell apparatus, and connecting the stillwell apparatus to the vessel.

Another preferred method for installation of a one piece stillwell comprises the steps of inserting the stillwell apparatus into a vessel, sealingly connecting the stillwell apparatus to the vessel, and connecting the cleansing conduit to an exterior source of cleanisng solution.

A more preferred method for installation of a two piece stillwell comprises the steps of inserting the lower section of the stillwell apparatus into the vessel, connecting the lower section of the stillwell apparatus to the upper section of the stillwell apparatus, connecting the cleansing conduit lower section to the cleansing conduit upper section, connecting the upper section to the exterior of the vessel, and connecting the cleansing conduit upper section to the exterior source of cleansing solution.

Another method for installation of the two piece stillwell comprises the steps of inserting the lower section of the stillwell apparatus into the vessel, sealingly attaching the lower section first end to the upper section second, sealingly attaching the cleansing conduit lower section conduit to the cleansing conduit upper section, attaching the upper section first end to the exterior of the vessel, and connecting the cleansing conduit upper section to an exterior source of cleansing solution.

A most preferred method for installation of a multi-piece stillwell comprises the steps of inserting the lower section into the vessel, sealingly connecting the lower section to the middle section, sealingly connecting the cleansing conduit lower section to the cleansing conduit middle section, inserting the middle section into the vessel, sealingly connecting the middle section to the upper section, sealingly connecting the cleansing conduit middle section to the cleansing conduit upper section, inserting the upper section into the vessel, sealingly connecting the upper section to the vessel, and sealingly connecting the cleansing conduit upper section to an exterior source of cleansing solution.

BRIEF DESCRIPTION OF THE DRAWINGS

FIG. 2 is a perspective view of a preferred embodiment of the new stillwell apparatus with inclusion of a middle section FIG.3 is a perspective view of a preferred embodiment of the new one piece stillwell apparatus.

FIG. 4 is a cross sectional view of the upper section first end, the lid, and the gas inlet tube.

Figure 1:
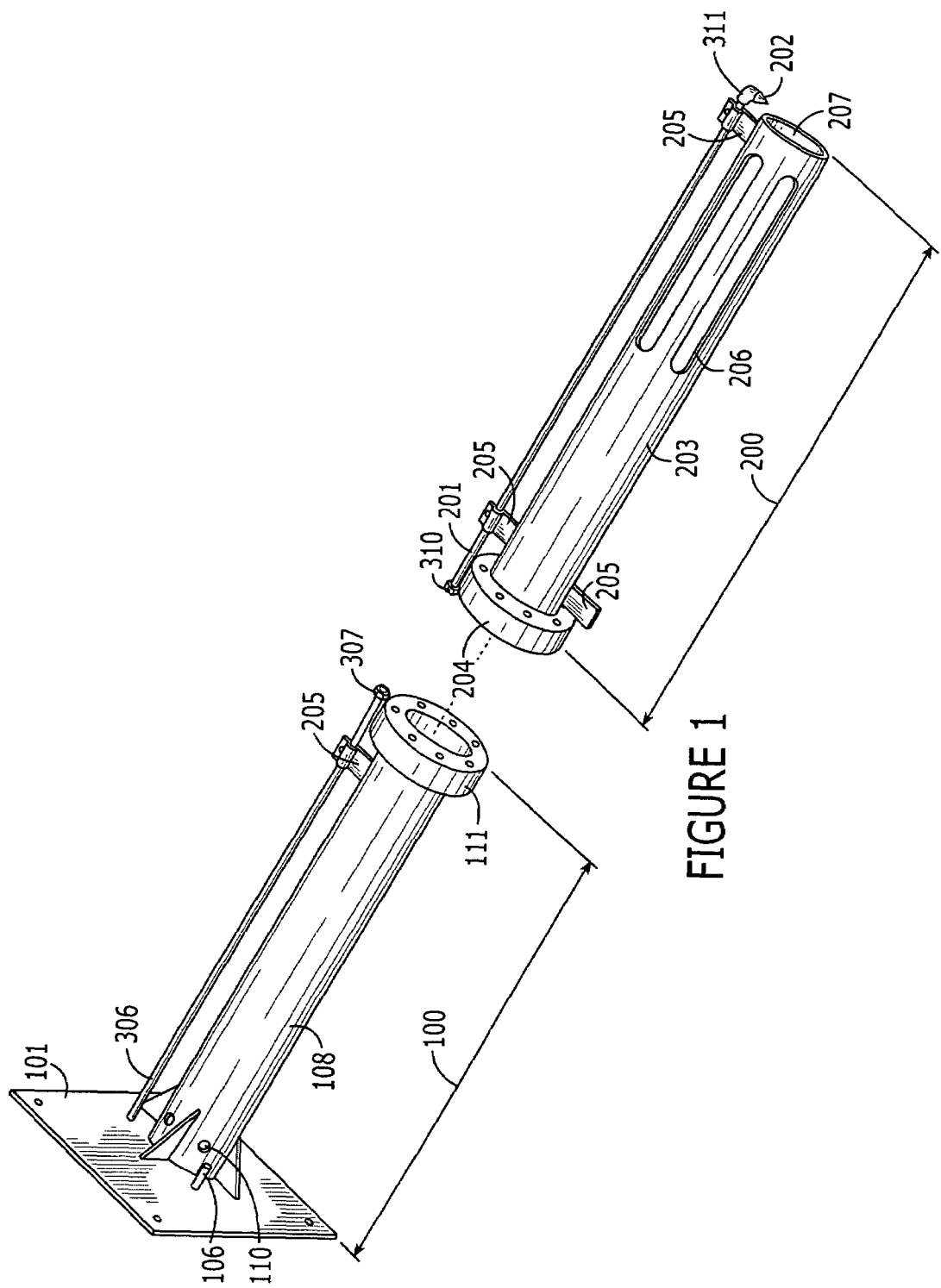
FIG. 1 is a perspective view of a preferred embodiment of the new two piece stillwell apparatus.

100 embodies a length of an upper section of the two piece stillwell
101 embodies the upper section first end flange
102 embodies the upper section first end flange openings
103 embodies the lid
104 embodies threaded fasteners for the lid
105 embodies a lid gasket
106 embodies a gas inlet tube
107 embodies an upper section conduit for delivering cleansing solution
108 embodies an upper section
109 embodies a gusset
110 embodies vent openings
111 embodies an upper section second end
112 embodies a threaded fastener for connecting an upper section second end
113 embodies a tab for attachment of the conduit for delivering cleansing solution
114 embodies the upper section first end
115 embodies lid openings
116 embodies upper section first end flange lid attachment openings
117 embodies a gas inlet tube valve
200 embodies a length of a lower section
201 embodies a lower section conduit for delivering the cleansing solution
202 embodies a nozzle on the conduit for delivering the cleansing solution
203 embodies a lower section
204 embodies a lower section first end
205 embodies tabs
206 embodies port holes
207 embodies a lower section second end
300 embodies a length of a middle section
301 embodies a middle section conduit for delivering cleansing solution
302 embodies a middle section
303 embodies a middle section second end
304 embodies a middle section first end
305 embodies tabs
306 embodies an upper section cleansing conduit first end
307 embodies an upper section cleansing conduit second end
308 embodies a middle section cleansing conduit first end
309 embodies a middle section cleansing conduit second end
310 embodies a lower section cleansing conduit first end
311 embodies a lower section cleansing conduit second end
312 embodies a cleansing conduit
313 embodies a length of a one piece stillwell
314 embodies a cleansing solution inlet valve

DETAILED DESCRIPTION OF THE INVENTION

Referring now to the drawings wherein like reference numerals designate identical or corresponding parts throughout the several views, FIG. 1 shows an embodiment of the present invention. Referring to FIG. 1, port holes (206) are located adjacent to the lower section second end (207) in order to allow the solution into and out of the stillwell apparatus.

The lower section (203) has tabs (205) for connecting the lower section conduit (201) to the exterior of the lower section (203). The tabs (205) serve to secure the conduit (201) to the exterior of the stillwell and also to temporarily suspend the respective section over the vessel opening while the next section is placed in position for assembly and sealing connection. The nozzle (202) is aligned with the lower section second end (202) which allows for cleansing of the stillwell with cleansing solution from the conduit (201). The conduit comprises a flush pipe, which delivers cleansing solution from an exterior source if and when the lower section second end (207) gets clogged with debris.

In a multipiece stillwell, the lower section first end (204) contains a flange with openings therein for sealingly connecting to the upper section second end (111) with threaded fasteners (112). The connection between the lower section first end (204) and the upper section second end (111) allows for fluid communication there between the lower section (203) and the upper section (108).

Once the upper section second end (111) is sealingly connected to the lower section first end (204), the upper section first end (114) can be connected to the exterior of the vessel by sealingly connecting the upper section first end flange (101) to the exterior of the vessel. The upper section first end (114) may be sealingly connected with conventional mechanical coupling means to the exterior of the vessel. The upper section first end flange (101) has openings (102) for use of threaded fasteners.

The cleansing conduit lower section (201) is connected to the cleansing conduit upper section (107) via conventional mechanical means which allow for fluid communication therebetween the entire length of the conduit. Then the exterior source of cleansing solution is connected to a cleansing solution inlet valve (314) if the port holes (206) and/or the lower section second end (207) become clogged.

The analytical device can be inserted into the interior of the new stillwell apparatus while the lid (103) is in the open position. The lid (103) can be sealingly attached to the upper section first end (114) with threaded fasteners (104) or other standard mechanical means, through the lid openings (115) and the upper section first end flange openings (116) and nuts and washers.

In order to allow gases to enter or escape the stillwell apparatus the gas inlet tube (107) has means for allowing or preventing movement of gases. The gas inlet tube (107) has the valve open position for allowing movement of gas through the gas inlet tube or the valve closed position for preventing movement of gas through the gas inlet tube.

Referring to FIG. 1, the middle section (302) allows for elongation of the length of the stillwell apparatus. If the middle section (302) is inserted there between the upper section second end (111) and the lower section first end (204) by sealingly connecting the middle section second end (303) to the lower section first end (204) with threaded fasteners and then subsequently connecting the middle section first end (304) to the upper section second end (111) with threaded fasteners (112), the length of the stillwell apparatus is extended by the middle section length (300).

Those skilled in the art will recognize that many modifications are possible without materially departing from the novel teachings and advantages of this invention. Accordingly, all such modifications are intended to be included within the scope of this invention as defined in the following claims.

I claim:

1. A stillwell apparatus for housing an analytical device, wherein the stillwell apparatus comprises:
    a) a generally cylindrical shape having an interior for housing the analytical device;
    b) an exterior for mounting parallel to said stillwell apparatus a means for cleansing said stillwell apparatus;
    c) an upper section and an opposing lower section, said upper section comprises means for sealingly connecting to an exterior of a vessel, said lower section comprises means for passage of solution to be analyzed; and
    d) a means for extending the length of the stillwell apparatus.

2. A stillwell apparatus according to claim 1 wherein said vessel is selected from the group consisting of underground storage tanks, chemical reaction vessels, water tanks, water wells, municipal waste containers, municipal tanks, waste water tanks, and sewage tanks.

3. A stillwell apparatus according to claim 1 wherein said upper section further comprises means for pressure equalization.

4. A stillwell apparatus according to claim 1 wherein said upper section further comprises means for pressure equalization and said pressure equalization comprises vent holes.

5. A stillwell apparatus according to claim 1 wherein said upper section further comprises a gas inlet tube.

6. A stillwell apparatus according to claim 1 wherein said upper section further comprises a lid.

7. A stillwell apparatus according to claim 1 wherein means for cleansing said stillwell apparatus comprises a conduit for delivery of a cleansing solution.

8. A stillwell apparatus according to claim 1 wherein said lower section comprises port holes.

9. A stillwell apparatus according to claim 1 wherein said means for extending the length of the stillwell apparatus further comprises a middle section appended therebetween said upper section and said lower section.

10. A stillwell apparatus for housing an analytical device, wherein the stillwell apparatus comprises:
    a) a generally cylindrical shape having an interior for housing the analytical device;
    b) an exterior for mounting parallel to said stillwell apparatus a means for cleansing said stillwell apparatus;
    c) an upper section and an opposing lower section, said upper section comprises means for sealingly connecting to an exterior of a vessel;
    d) a means for extending the length of the stillwell apparatus;
    e) said vessel is selected from the group consisting of underground storage tanks, chemical reaction vessels, water tanks, water wells, municipal waste containers, municipal tanks, waste water tanks, and sewage tanks;
    f) said upper section further comprises means for pressure equalization, wherein said means for pressure equalization comprises vent holes;
    g) said upper section further comprises a gas inlet tube;
    h) said upper section further comprises a lid; and
    i) said means for cleansing said stillwell apparatus comprises a conduit for delivery of a cleansing solution from an exterior source of a cleansing solution to the lower section of the stillwell; and
    j) said means for extending the length of said stillwell apparatus comprises insertion of a middle section therebetween said upper section and said lower section.

11. A stillwell apparatus for housing an analytical device according to claim 9 wherein said means for cleansing said stillwell apparatus comprises a conduit for delivering a cleansing solution, said conduit having first and second opposite ends, said conduit further comprising a means for providing a pressurized flow of said cleansing solution from said conduit first end to said conduit second end, wherein said cleansing solution is selected from the group consisting of gaseous cleansers, liquid cleansers, and solid cleansers, said conduit first end comprising means for attachment to a cleansing solution container, said means for attachment to a cleansing solution container comprising a cleansing solution inlet valve, said cleansing solution inlet valve nozzle having an off position and an on position, wherein said on position allows lbr delivery of said cleansing solution to said cleansing conduit and said off position prevents delivery of said cleansing solution to said cleansing conduit, said conduit second end having a nozzle for delivering said cleansing solution to said portholes of said lower section, said nozzle having an off position and an on position, wherein said on position allows for delivery of said cleansing solution to said portholes of said lower section, and said off position prevents delivery of said cleansing solution to said portholes of said lower section.

12. A stillwell apparatus for housing an analytical device according to claim 9 further comprising;
   a) the middle section having means for elongating the length of the stillwell apparatus;
   b) said upper section having an opening for passage of the analytical device to said interior of said stillwell apparatus;
   c) said upper section having a gas inlet tube comprising a means for allowing gas into said protector when a gas inlet valve is in an open position, said gas inlet tube further comprising a means for preventing movement of gas into said protector when said gas inlet valve is in a closed position; and
   d) said upper section having a lid wherein said lid comprises a lid open position and a lid closed position, said lid open position allows for passage of the analytical device to said interior of said stillwell apparatus, said lid further comprises means for sealingly attaching said lid to said upper section.

13. A stillwell apparatus for housing an analytical device according to claim 9 wherein said gas inlet valve comprises a valve open position and a valve closed position, said valve open position comprises means for allowing gas in or out of said stillwell apparatus, said valve closed position comprises means for preventing movement of gas in or out said stillwell apparatus.

14. A stillwell apparatus according to claim 9, further comprising e) said upper section comprises means for sealingly connecting to an exterior of a vessel, wherein said vessel is selected from the group consisting of underground storage tanks, chemical reaction vessel, water tanks, water wells, municipal waste containers municipal tanks, waste water tanks, and sewage tanks.

15. A stillwell apparatus for housing an analytical device according to claim 14 wherein the upper section further comprises a first end and a second end, the middle section further comprises a first end and a second end, the lower section further comprises a first end and second end, wherein the upper section first end is scalingly connected to an exterior of a vessel, the upper section second end is sealingly connected to the middle section first end, the middle section second end is sealingly connected to the lower section first end, and the lower section second end comprises port holes.

16. A stillwell apparatus for housing an analytical device, wherein the stillwell apparatus comprises:
   a) a generally cylindrical shape having an interior for housing the analytical device;
   b) an exterior for mounting parallel to said stillwell apparatus a means for cleansing said stillwell apparatus;
   c) an upper section comprising first and second opposite ends, said upper section first end sealingly connected to a top of a vessel and the upper section second end sealingly connected a lower section and in fluid communication therewith,
   d) the lower section comprising first and second opposite ends, said lower section first end sealingly connected to said upper section second end, said lower section second end comprising a plurality of port holes to admit a solution to be analyzed.

17. A stillwell apparatus for housing an analytical device according to claim 16 wherein said means for cleansing said stillwell apparatus comprises a conduit for delivering a cleansing solution, said conduit having first and second opposite ends, said conduit comprising a means for providing a pressurized fluid flow of said cleansing solution from said conduit first end to said conduit second end, wherein said cleansing solution is selected from the group consisting of gaseous cleansers, liquid cleansers, and solid cleansers, said conduit first end comprising means for attachment to a cleansing solution container, said conduit second end having a nozzle for delivering said cleansing solution to said portholes of said lower section, said nozzle having an off position and an on position, wherein said on position allows for delivery of said cleansing solution to said portholes of said lower section, and said off position prevents delivery of said cleansing solution to said portholes of said lower section.

18. A stillwell apparatus for housing an analytical device according to claim 16 further comprising a means for elongating the length of said stillwell apparatus.

19. A stillwell apparatus for housing an analytical device according to claim 16 further comprising a means for elongating the length of said stillwell apparatus wherein said means for elongating the length of said still comprises a middle section, said middle section sealingly connected there between said upper section and said lower section and in fluid communication therewith.

20. A method for installing a stillwell apparatus for housing an analytical device comprising the steps of
   a) providing a stillwell apparatus; said stillwell apparatus comprising an upper section, said upper section comprising a gas inlet tube, a lid, and vent holes; an opposite lower section, said lower section having port holes; an interior and an exterior;
   b) attaching a conduit to said exterior;
   c) inserting said stillwell apparatus into a vessel;
   d) attaching a lid to the stillwell upper section; and
   e) sealingly connecting said upper section to said vessel.

21. A method for installing a stillwell apparatus according to claim 20 further comprising the step of increasing the length of said stillwell apparatus after said stillwell apparatus is within a vessel.

22. A method for installing a stillwell apparatus according to claim 20 further comprising the steps of attaching the upper section of the stillwell apparatus to said vessel, wherein said vessel is selected from the group consisting of underground storage tanks, chemical reaction vessels, water tanks, water wells, municipal waste containers, municipal tanks, waste water tanks, and sewage tanks.

23. A method for installing a stillwell apparatus for housing an analytical device comprising the steps of
   a) providing a stillwell apparatus, said stillwell apparatus comprising a generally cylindrical shape having en interior for housing the analytical device, an exterior, an upper section having first and second opposite ends, and a lower section having first and second opposite ends;

b) mounting on said exterior and parallel to said stillwell apparatus a cleansing conduit for cleansing said stillwell apparatus;

c) attaching an upper section first end to an exterior of a vessel, said upper section first end comprising vents; and d) connecting an upper section second end to a lower section first end.

24. A method for installing a stillwell apparatus for housing an analytical device comprising the steps of a) providing a stillwell apparatus, said stillwell apparatus comprising a generally cylindrical shape having an interior for housing the analytical device, an exterior, an upper section having first and second opposite ends, and a lower section having first and second opposite ends;

b) mounting on said exterior and parallel to said stillwell apparatus a cleansing conduit for cleansing said stillwell apparatus;

c) inserting said stillwell apparatus into a vessel, d) extending the length of said stillwell apparatus, and e) connecting said stillwell apparatus to an exterior of a vessel.

25. A method for installing a stillwell apparatus for housing an analytical device comprising the steps of a) providing a stillwell apparatus, said stillwell apparatus comprising a generally cylindrical shape having an interior for housing the analytical device, an exterior, an upper section having first and second opposite ends, and a lower section having first and second opposite ends;

b) mounting on said exterior and parallel to said stillwell apparatus a cleansing conduit for cleansing said stillwell apparatus;

c) attaching an upper section first end to an exterior of a vessel, said upper section first end comprising vents;

d) connecting an upper section second end to a lower section first end; and e) extending the length of said stillwell apparatus.

26. A method for cleaning a stillwell apparatus comprising the steps of:

a) inserting a stillwell apparatus into a vessel, wherein said stillwell apparatus comprises an interior for housing an analytical device and an exterior for attaching a means for cleansing said stillwell apparatus, b) connecting said stillwell apparatus to said vessel, c) connecting said means for cleansing said stillwell apparatus to an exterior source of cleansing solution, d) extending the length of said stillwell apparatus, e) inserting an analytical device for the detection of substances selected from the group consisting of gases, liquids, and solids, f) detecting a physical parameter associated with substances selected from said group consisting of gases, liquids, and solids, g) cleansing said stillwell apparatus with substances selected from the group consisting of liquid cleansers, solid cleansers, and gaseous cleansers.

27. A stillwell apparatus for housing an analytical device, wherein the stillwell apparatus comprises:

a) a generally cylindrical shape having an interior for housing the analytical device;

b) an exterior for mounting parallel to said stillwell apparatus a means for cleansing said stillwell apparatus.

28. A stillwell apparatus for housing an analytical device, wherein the stillwell apparatus comprises:

a) a generally cylindrical shape having an interior for housing the analytical device;

b) an exterior for mounting parallel to said stillwell apparatus a means for cleansing said stillwell apparatus; and c) a means for extending the length of the stillwell apparatus.

* * * * *